Jan. 20, 1925.

H. A. GRINE

MANUFACTURE OF ZINC OXIDE

Filed Dec. 22, 1921

Jan. 20, 1925. 1,523,416
H. A. GRINE
MANUFACTURE OF ZINC OXIDE
Filed Dec. 22, 1921  3 Sheets-Sheet 2

INVENTOR.
Harry A. Grine,
BY Ward, Crosby and Smith
His ATTORNEYS.

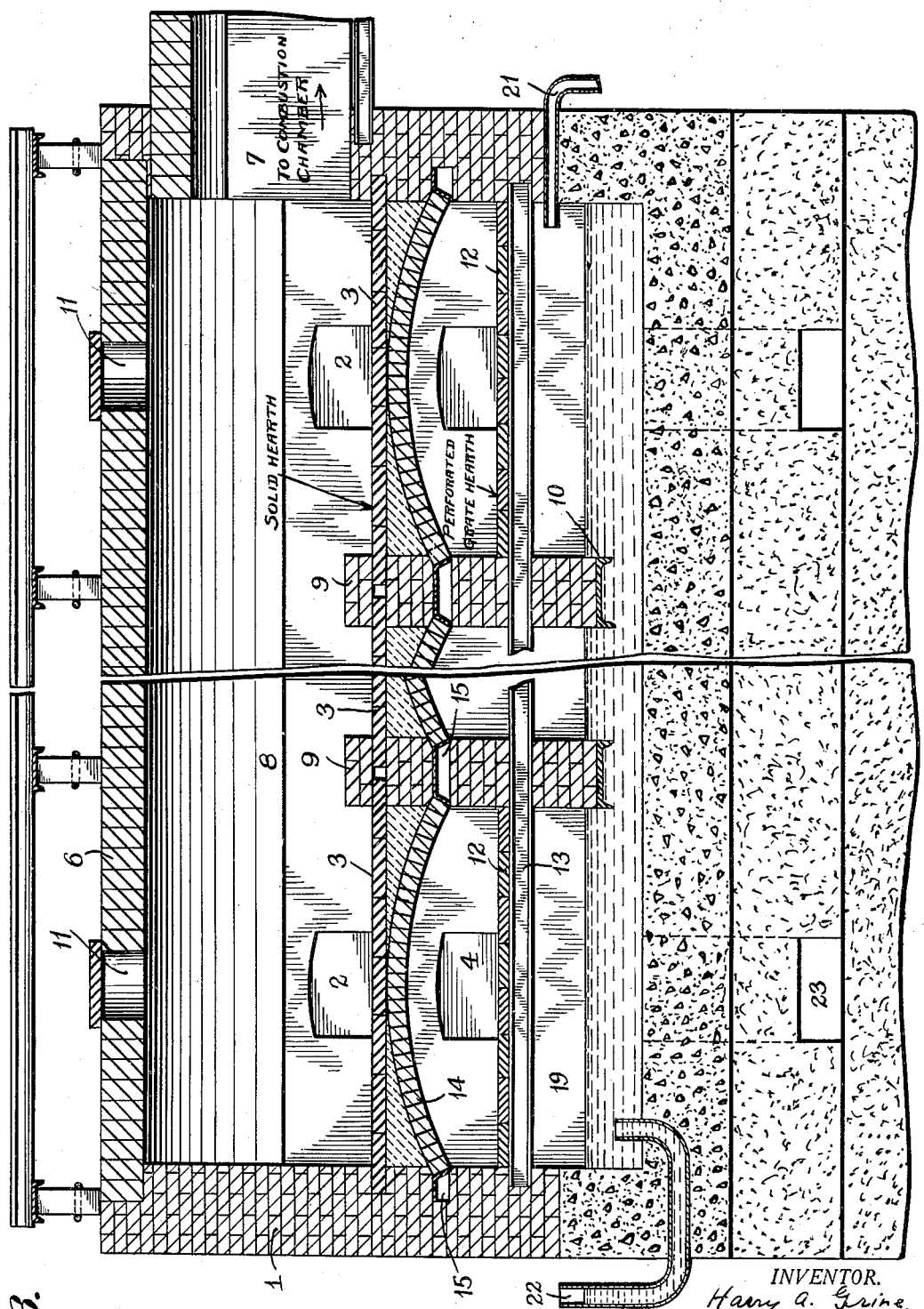

Patented Jan. 20, 1925.

1,523,416

UNITED STATES PATENT OFFICE.

HARRY A. GRINE, OF LANGELOTH, PENNSYLVANIA.

MANUFACTURE OF ZINC OXIDE.

Application filed December 22, 1921. Serial No. 524,084.

*To all whom it may concern:*

Be it known that I, HARRY A. GRINE, a citizen of the United States, and resident of Langeloth, in the county of Washington and State of Pennsylvania, have invented certain new and useful Improvements in the Manufacture of Zinc Oxide, of which the following is a specification.

The invention relates chiefly to the manufacture of zinc oxide, which is adapted for use as pigment and for other commercial uses, the zinc oxide being produced from metallic zinc dross or from other alloy containing zinc, or from scrap or other metallic zinc. While the invention, as stated, refers particularly to the manufacture of zinc oxide, it may be considered more broadly as relating to the manufacture of oxides of metals which are volatilizable and readily oxidizable, from the metals themselves or from alloys containing the same. The invention includes both an improved and novel process and apparatus suitable for use in practicing the process.

Zinc oxide, of a purity sufficient for use as a pigment or for use as a filler in rubber tires and for other commercial uses, is commonly made by a process of reduction and reoxidation of zinc ore on a so-called Wetherill or pin hole grate hearth. It is not possible to utilize this apparatus for the production of zinc oxide from metallic zinc dross or zinc scrap because the latter melt and become liquid before volatilizing, so that they cannot be charged directly on such grates, since the molten metal filters through the coke or fuel used on the grate and into the perforations of the grate, and stops the flow of air through the same.

Zinc oxide pigment is produced from metallic zinc to some extent by what is known as the French process, in which the zinc is volatilized in retorts through which a stream of non-oxidizing gas is passed to remove the volatilized zinc to a small combustion flue in which the metal vapors are oxidized, and thence to a chamber collecting system for collecting the zinc oxide. This process is rather a complicated one, has a comparatively small capacity, requires expert operatives, and owing to the necessity of retreating the product by heating it to give it a desirable color tone is more expensive to carry out than the usual process of manufacturing zinc oxide pigment from the zinc ores.

An object of the present invention is to produce a process whereby the zinc dross, scrap zinc and the like, may effectively and economically be converted into zinc oxide suitable for pigment, or other commercial uses. Other objects of the invention relate to improved process steps and combinations, and the production of improved apparatus of the character referred to, together with structural details and combinations of parts in the apparatus, all as will be more fully set forth in the following specification and particularly pointed out in the appended claims.

In carrying out the process the material comprising or containing the metal is subjected to a preliminary distillation on a solid hearth whereby the zinc is volatilized until a crust or residue containing zinc oxide remains. This latter is then transferred to a Wetherill grate hearth or the like, where a reducing fuel such as coke is added and the material subjected, under a blast of air, to reduction and re-oxidation. The hot gases and air from this operation are conducted above the solid hearth where the vapors produced by the distillation of the zinc metal mingle therewith and are oxidized, the mingled hot gases and air being conducted away, preferably, into a large combustion chamber and thence through a large cooling pipe line into a filtering bag house. Preferably the solid hearth is placed directly above the pin hole grate so that the heat from the latter will serve to distill the metal on the solid hearth, partly by heating the latter from below and partly by reason of the fact that the hot gases and air from the grate are carried around over the solid hearth into contact with the material thereon.

In order that the invention may be more clearly understood attention is hereby directed to the accompanying drawings forming part of this application and illustrating one form of apparatus included within the invention, and also illustrating the manner in which the improved process may be carried out. In the drawings—

Fig. 3 is a vertical elevation taken on line 3—3 of Fig. 2, shown partly broken away.

Figure 1:
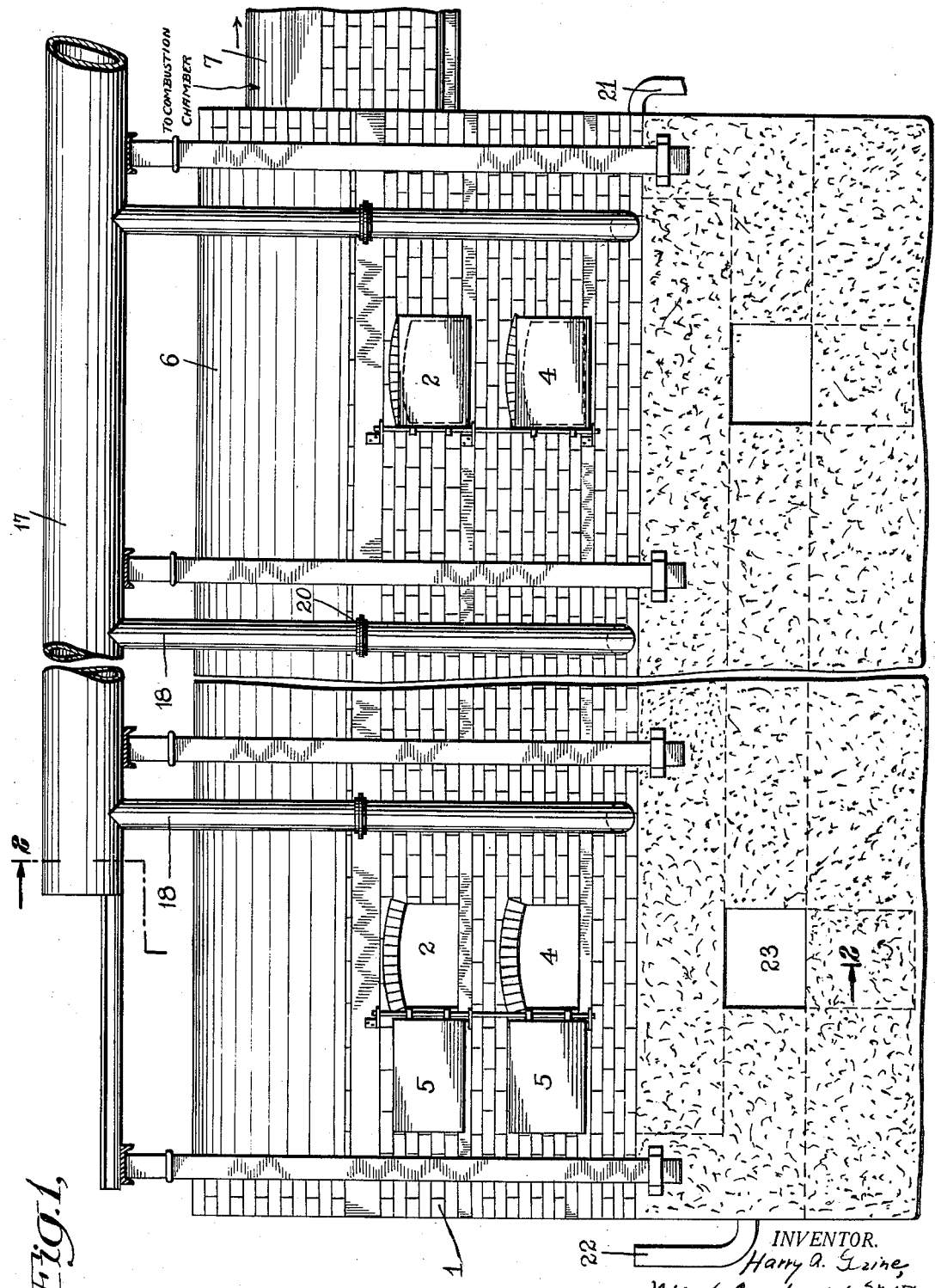
Fig. 1 represents a front elevation, partly broken away, of a furnace having a plurality of compartments embodying one form of apparatus included within the invention.

Referring to the drawings, which are intended to represent a four compartment furnace, the latter may be provided with outer walls 1 of suitable refractory material, the front and rear walls being provided with openings 2, 2, leading to the upper hearths 3, 3, of the various compartments of the furnace. The front and rear walls are also provided with openings 4, 4, leading to the lower hearth level of the furnace, the openings 2 and 4 being provided with suitable doors 5, 5. The furnace is provided with a top arch 6 extending over the various compartments. The flue 7 is indicated as leading from one end of the space 8 above the hearths 3, this flue being intended to lead to a large combustion chamber (not shown).

The furnace is divided into compartments by the division walls 9, 9, which are indicated as supported on channel members 10, the ends of which are supported in the outside front and rear walls of the furnace. The solid hearths 3 are supported between the division walls 9 and the end walls of the furnace, as shown, the division walls 9 preferably extending upwardly for only a short distance above the hearths 3. Charge openings in the top arch 6 are indicated at 11.

The lower hearths 12 take the form of suitable grates through which air may be blown, these grates preferably being of the type known as the Wetherill, or pin hole grates. These grates are preferably supported by eye beams or the like 13, which extend through the division walls 9 and into the end walls 1 of the furnace.

Figure 2:
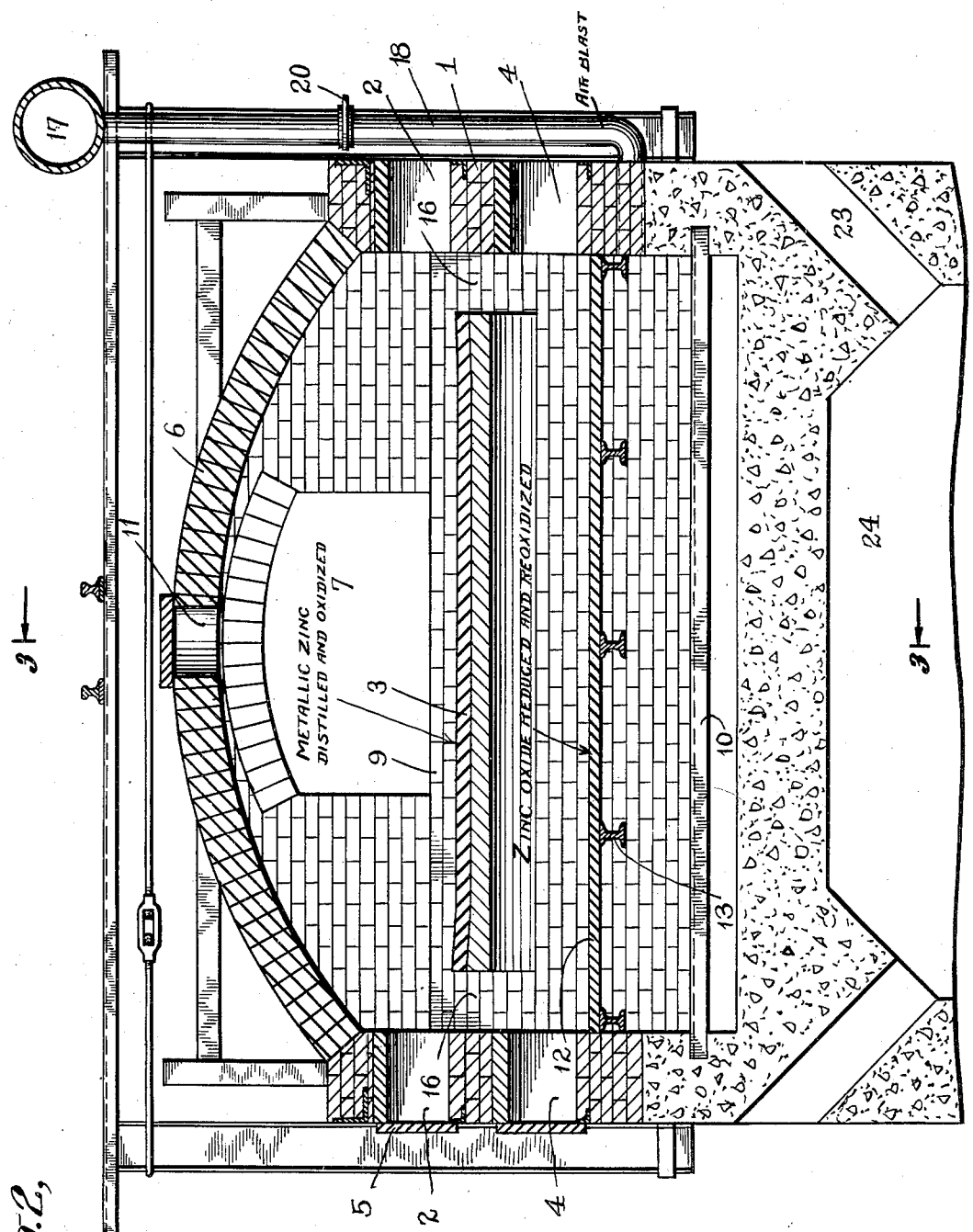
Fig. 2 is a vertical section taken on line 2—2 of Fig. 1.

Each upper hearth 3 is preferably supported by an arch 14, the ends of which are supported by the end and division walls 1 and 9 of the furnace, the ends of these arches preferably abutting against suitable angular members 15, positioned within the walls, the space between each upper portion 3 of a hearth and its supporting arch 14 being filled with suitable refractory material. Each upper hearth 3 with its supporting arch is of a length, from front to rear of the furnace, somewhat less than the distance between the front and rear walls of the furnace so as to leave vertical passages 16, as indicated in Fig. 2, at the ends of the upper hearths, through which the hot gases and air from the lower hearths may pass upward. The upper surface of each upper hearth 3 is preferably somewhat concaved from front to rear, as shown in Fig. 2, so as to enable a shallow pool of molten metal to remain thereon without running over the ends of the hearth.

Air for the operation of the furnace may be conducted by a main air pipe 17 from which vertical connections 18 extend at intervals to carry air into the chambers 19 below each lower hearth. The air supply may be regulated by suitable sheaver valves indicated at 20 in the downwardly extending pipes 18.

Preferably water is maintained in the chambers 19 to assist in cooling the Wetherill grates and also to saturate the air with moisture so as to assist in preventing hard clinkering on the grates. Water may be introduced into the chambers 19 by the inlet at 21, the water outlet being indicated at 22 at the opposite end of the furnace. The water level is intended to be maintained at a height above the bottoms of the division walls 9, as indicated, so as to provide a water seal for the various chambers 19.

In operation the furnace may be started by igniting wood on the Wetherill hearths 12, on which beds of live fire are obtained, after which coke or other reducing fuel may be charged on hearths 12 through openings 4 and the fire blasted until the entire furnace has been brought to a bright red heat, or about 1800 degrees Fahrenheit, A charge of zinc dross, or scrap zinc, or other material to be treated is then put upon each upper hearth 3 together with sufficient fine coke or anthracite coal to prevent excessive oxidation on the metal surface. Sufficient fine coke to cover the charges of metal may be dropped through the openings 11 in the upper arch and raked over the charges of metal. I have found that with a hearth of sixty-six square feet of area, for example, a charge of about four hundred (400) pounds of zinc covered with about two-hundred and fifty (250) pounds of fine coke screening will constitute suitable proportions, the invention, of course, not being limited to the use of such proportions or materials.

The charges on the upper hearths will be heated by a direct transmission of heat through the hearths and also by the hot products of combustion and air from the lower hearths which pass around the upper hearths through the end spaces 16.

In a short time volatilization of the metal begins and the vapors ignite over the charge, the oxidation of the metallic zinc vapors adding heat to the system. The charge on each upper hearth is rabbled from time to time with a hand rabble which may be inserted through an opening 2 to facilitate the volatilization and combustion of the zinc.

When the evolution of the zinc vapors from the charge has practically ceased the remaining residue, consisting of a crust comprising zinc oxide, and any foreign metals such as iron which are contained in the zinc dross or scrap, and the zinc coated coke, are raked down through openings 16 on to the lower or Wetherhill grate hearths, and are raked over and into the coke charge on this hearth. A new charge of metallic zinc is now charged on to the upper hearth, together with a covering of fine coke as above described, and the operation on the upper hearth repeated, while the residue from the previous charge is being worked off on the lower hearth. At intervals of, usually, from four to six hours, the charge on each lower hearth having been worked off is removed, in the same manner as when the ore is being worked, and a fresh charge of coke put in on the lower hearth. The clinker from the lower hearths may be raked out and shoveled through openings 23 into the clinker cellar 24, where it may be carried away by cars. The insertion of the fresh charge of coke on the lower hearth is effected shortly before the residue from the upper hearth is raked down thereon, a sufficient time being allowed to permit the new coke charge on the lower hearth to become ignited before the residue from the upper hearth is raked down thereon.

On the lower hearth the reduction of the zinc oxide contained in the residue, in mixture with coke or anthracite reducing fuel, is completed, the zinc vapors being subsequently oxidized as they rise sufficiently above the charge. The gases passing upwardly from the lower hearths through openings 16 will contain zinc oxide and air, these gaseous products mingling above the upper hearths 3 with the volatile vapors which rise above the charges on the upper hearths, the metallic zinc vapors from the upper hearths being oxidized to a very substantial extent in contact with the hot gases and air from the lower hearths. The mingled gases are now carried off through the flue indicated at 7 and into a large combustion chamber where any incompletely oxidized zinc or carbonaceous material is oxidized. From the combustion chamber the gases carrying the zinc oxide may be drawn by fan suction through a large cooling pipe line and discharged into a filtering bag house in the same manner as when operating on ores. These devices are old and I have not deemed it necessary to illustrate the same. In the pipe line the gases are sufficiently cooled to be discharged into the bag house filter where the zinc oxide, for use as pigment or otherwise, is filtered from the gas and collected in the same manner as is now practiced with zinc oxide made from ores.

In the drawings I have shown the upper preliminary distillation and oxidation hearths situated above the lower or Wetherill grate hearths, and in direct communication therewith through slots or openings 16 at the ends of the upper hearths, this construction being deemed preferable by me because of the economy and efficiency secured thereby since the heat and gases from the lower hearths are thereby utilized to heat the upper hearths and carry oxide away from the upper hearths as rapidly as the same is produced. It should be understood, however, that I do not wish to limit my improved process or apparatus to this particular arrangement, my invention covering any process or apparatus in which the metal is given a preliminary volatilization and oxidation and the residue removed from this preliminary operation to a finishing hearth, whereby practically all of the metallic zinc originally charged may be converted into zinc oxide suitable for pigment.

The apparatus may also be used by working zinc ore on the lower or Wetherill hearths in place of, or together with, the residue which I have described as being raked down from the upper hearths to the lower hearths, in which case the hot gases and air from the lower hearths will heat the upper hearths and commingle with the zinc vapors from the upper hearths in the same manner as previously described.

It is believed that the operation of the process will entirely clear from the above description. When the furnace is in operation, the charges of material including zinc oxide on the lower hearths will be subjected to reduction and subsequent oxidation while the metallic charges on the upper hearths will be subjected to distillation, the zinc vapors evolved being oxidized as they commingle with the hot gases from the lower hearths. As the operation is completed on each lower hearth the clinker is raked out and removed, whereupon a new charge of coke will be placed on the grate and ignited and the residue from the hearth 3 above the same raked down thereupon, after which a fresh charge will be placed on the hearth 3.

In the preferred form of the invention a battery or series of compartments, each containing an upper and a lower hearth, are used, the hot gases from all of these hearths mingling in the space above the upper hearths, which space forms a passage or chamber common to all the upper hearths. In such a system the temperature should be maintained as constant as possible throughout the furnace, the lower hearths naturally being a little hotter than the upper hearths, except at the times when the lower hearths are receiving coke. The whole furnace is maintained under suction, and accordingly will not be subject to leakage.

It should be understood that the invention is not limited to the exact details of construction and steps of process which have been particularly described but is as broad as is indicated by the accompanying claims.

What I claim is:

1. The process of producing zinc oxide suitable for commercial uses which comprises, subjecting metallic zinc to distillation and oxidation until a residue containing zinc oxide remains, then subjecting this residue to reduction and re-oxidation, and collecting the vapors produced by both operations.

2. The process of producing zinc oxide suitable for commercial uses which comprises, subjecting metallic zinc, on a solid hearth, to distillation and oxidation until a residue containing zinc oxide remains, then removing this residue to a perforated grate, adding a reducing fuel, subjecting the residue to reduction and re-oxidation, and collecting the vapors produced by both operations.

3. The process of producing zinc oxide suitable for commercial uses which comprises, subjecting metallic zinc to distillation and oxidation until a residue containing zinc oxide remains, then subjecting this residue to reduction and re-oxidation, mingling the vapors produced by both operations, and completing the oxidation of any incompletely oxidized zinc in the vapors.

4. The process of producing zinc oxide which comprises, subjecting a metallic alloy including a large proportion of zinc to distillation and oxidation until a residue containing zinc oxide remains, then subjecting this residue to reduction and re-oxidation, and collecting the vapors produced by both operations.

5. A process of producing a metallic oxide which comprises, subjecting a readily oxidizable, volatilizable metal to distillation and oxidation until a residue containing the oxide of the metal remains, then subjecting this residue to reduction and re-oxidation, collecting the vapors produced by both operations, and completing the oxidation of any incompletely oxidized portion of the metal in the vapors.

6. The process of producing zinc oxide suitable for commercial uses which comprises, subjecting metallic zinc to distillation and oxidation until a residue containing zinc oxide remains, simultaneously subjecting, at a different point, a material containing zinc oxide to reduction and re-oxidation, passing the hot gases and air from the last named operation above the point at which the first named operation is carried out into contact with the material there being treated, and mingling and collecting the vapors.

7. The process of producing zinc oxide suitable for commercial uses, which comprises, volatilizing metallic zinc, simultaneously subjecting, at a different point, a material containing zinc oxide to reduction and re-oxidation, and mingling the hot gases and air from the last named operation with the vapors produced by the first operation to thereby oxidize said vapors.

8. A process of producing a metallic oxide which comprises, volatilizing a readily oxidizable volatilizable metal, simultaneously subjecting, at a different point, a material containing the oxide of the metal to reduction and re-oxidation, and mingling the hot gases and air from the last named operation with the vapors produced by the first operation to thereby oxidize said vapors.

9. The process of producing zinc oxide suitable for commercial uses which comprises, subjecting metallic zinc, covered by sufficient reducing fuel to prevent excessive oxidation thereof, to volatilization, subjecting, simultaneously, a material containing zinc oxide to reduction and re-oxidation, and mingling the hot gases and air from the last named operation with the vapors produced by the first operation to thereby oxidize said vapors.

10. The process of producing zinc oxide suitable for commercial uses which comprises, subjecting a material containing zinc oxide to reduction and re-oxidation, passing the resulting hot gases and air above a solid hearth containing metallic zinc, volatilizing the latter, by the heat of the gases and by heat applied through the hearth and causing the zinc vapors thus produced to mingle with said hot gases and air.

11. The process of producing zinc oxide suitable for commercial uses which comprises, subjecting a material containing zinc oxide to reduction and re-oxidation, passing the resulting hot gases and air above a solid hearth containing metallic zinc, volatilizing the latter, by the heat of the gases and by heat applied through the hearth, transferring the residue from the solid hearth, when the volatilization is substantially completed, to the point at which the first named operation is carried out, renewing the charge of metallic zinc on the solid hearth, and carrying on the operations at both points continuously.

12. The process of producing zinc oxide suitable for commercial uses which comprises, subjecting metallic zinc to a preliminary distillation, removing the residue, containing zinc oxide, to another point and subjecting it to reduction and re-oxidation, renewing the charge of zinc for the first operation as often as the volatilization of the metal is substantially completed and transferring the residue to the point at which the second operation is conducted, and causing the hot gases and air from the second operation continuously to mingle with and oxidize the vapors produced by the first operation.

13. The process of producing zinc oxide suitable for commercial uses which comprises, subjecting metallic zinc to a preliminary distillation, while subjecting the residue from a previous distillation, containing zinc oxide, to reduction and re-oxidation at another point, utilizing the heat of said second operation to perform the first operation, and causing the hot gases and air from the second operation to mingle with the zinc vapors produced by the first operation to oxidize the latter.

14. In a furnace of the character described, the combination of a solid hearth adapted to contain molten metal, a perforated grate hearth adapted to receive metallic oxide and fuel, means for blowing air through said grate hearth, means for conducting hot gases and air from above said grate hearth to a point above said solid hearth, and means for conducting gases and air away from said point.

15. In a furnace of the character described, the combination of a solid refractory hearth adapted to contain molten metal, a pin hole grate hearth, adapted to receive metallic oxide and fuel directly below said solid hearth, means for introducing air under said grate hearth, means for conducting hot gases and air from above said grate hearth to a point immediately above said solid hearth, and means for withdrawing commingled gases at said point from the furnace, said solid hearth being adapted to be heated by the heat produced by said grate.

16. In a furnace of the character described, the combination of an enclosing structure, a perforated grate hearth, a solid hearth of refractory material above the same, the structure being arranged to provide passages by which gases from the lower hearth may pass above the upper hearth and by which material on the upper hearth may be pushed down on to the lower hearth and said solid hearth being somewhat concaved and arranged to permit the pushing of material therefrom through said passages, to the lower hearth, means for introducing air under the lower hearth, and means for withdrawing gases above the upper hearth from the furnace.

17. In a furnace of the character described, the combination of walls and a covering member, a perforated grate hearth and a solid hearth therein, means for introducing air below said grate hearth and for withdrawing gases from the furnace from above said solid hearth, the arrangement being such that said solid hearth will be heated by hot gases from said grate hearth, and hot gases from said grate hearth will pass above said solid hearth through passages on opposite sides of said solid hearth, and mingle with gaseous products rising from said solid hearth.

18. In a furnace of the character described, the combination of walls and a covering member, a plurality of perforated grate hearths adapted for the reception of metallic oxide to be reduced, and fuel, and solid hearths therein the latter being in a continuous series separated by low division walls, means for introducing air below said grate hearths, means for conducting hot gases from said grate hearths above said solid hearths, the structure affording a continuous passageway above said solid hearths in which gaseous products from said solid and grate hearths will mingle, and means for withdrawing gases in said passageway from the furnace.

19. The process of producing zinc oxide suitable for commercial uses which comprises, subjecting a material containing zinc oxide to reduction and re-oxidation, utilizing the resulting hot gases and air to volatilize and oxidize metallic zinc, and collecting the zinc oxide formed.

20. The process of producing zinc oxide suitable for commercial uses which comprises, placing a charge comprising metallic zinc on a series of solid hearths maintaining fires, blasted by air, beneath the hearths, and conducting the hot gases and air from the fires above the charges, to volatilize the zinc by the heat applied from below and above each charge, and to oxidize the zinc vapors, and causing the vapors from all the charges to commingle and be collected.

21. The process of producing zinc oxide suitable for commercial uses which comprises, subjecting materials containing zinc oxide to reduction and re-oxidation at a plurality of points, passing the resulting hot gases and air above a plurality of solid hearths containing metallic zinc, volatilizing the latter, by the heat of the gases and by the heat applied through the hearths, and causing all the zinc vapors thus produced to mingle as soon as produced, with said hot gases and air, and be oxidized thereby.

Signed at Langeloth, in the county of Washington and State of Pennsylvania this 16th day of December A. D. 1921.

HARRY A. GRINE.